US007266897B2

(12) United States Patent
Treichler et al.

(10) Patent No.: US 7,266,897 B2
(45) Date of Patent: Sep. 11, 2007

(54) SELF-ALIGNING, SELF PLUMBING BASELINE INSTRUMENT

(75) Inventors: Timothy A. Treichler, Redmond, OR (US); Robert J. Blick, Rohnert Park, CA (US); Robert W. Vanneman, Bend, OR (US)

(73) Assignee: Laserline Mfg., Inc., Redmond, OR (US)

( * ) Notice: Subject to any disclaimer, the term of this patent is extended or adjusted under 35 U.S.C. 154(b) by 352 days.

(21) Appl. No.: 10/873,538

(22) Filed: Jun. 21, 2004

(65) Prior Publication Data

US 2005/0278963 A1 Dec. 22, 2005

(51) Int. Cl.
*G01C 15/00* (2006.01)
*G01B 11/26* (2006.01)

(52) U.S. Cl. ...................... 33/286; 33/283; 33/DIG. 21

(58) Field of Classification Search .......... 33/281–283, 33/285–286, 290–291, DIG. 21
See application file for complete search history.

(56) References Cited

U.S. PATENT DOCUMENTS 4,062,634 A 12/1977 Rando et al.
5,108,177 A 4/1992 Middleton
5,517,023 A 5/1996 Ohtomo et al.
5,612,781 A 3/1997 Ohtomo et al.
5,636,018 A 6/1997 Hirano et al.
5,703,718 A 12/1997 Ohtomo et al.
5,708,748 A 1/1998 Ohtomo et al.
5,745,623 A 4/1998 Ohtomo et al.
5,751,459 A 5/1998 Ohtomo et al.
5,764,349 A 6/1998 Vanneman
5,808,771 A 9/1998 Ohtomo et al.
5,819,424 A 10/1998 Ohtomo et al.
5,825,788 A 10/1998 Pawlowski
5,864,956 A * 2/1999 Dong .......................... 33/227
5,894,123 A 4/1999 Ohtomo et al.
5,898,489 A 4/1999 Ohtomo et al.
5,909,455 A 6/1999 Ohtomo et al.
5,911,325 A 6/1999 Breitler
5,926,305 A 7/1999 Ohtomo et al.
5,936,987 A 8/1999 Ohishi et al.
5,946,087 A 8/1999 Kasori et al.
5,991,325 A 11/1999 Ohtomo et al.
6,002,696 A 12/1999 Ohishi et al.

(Continued)

OTHER PUBLICATIONS

Topcon RL-VH3A Series, pp. 1-4, 2000.

(Continued)

*Primary Examiner*—Yaritza Guadalupe-McCall
(74) *Attorney, Agent, or Firm*—Theodore W. Baker

(57) ABSTRACT

A self aligning baseline instrument including a first light assembly operable to generate a first vertical light plane, a second light assembly operable to generate a second vertical light plane at a predetermined angle to the first vertical light plane, a third light assembly operable to generate a first horizontal light plane that is perpendicular to the first and second vertical light planes, and a fourth light assembly operable to generate a vertical plumb light beam that defines a reference point on an underlying surface, the vertical light beam parallel to and coincident to the center axis of the instrument. The first and second vertical light planes and fourth plumb laser beam all intersect together through the center axis of the instrument.

23 Claims, 7 Drawing Sheets

19
17
21
23

U.S. PATENT DOCUMENTS

| | | | | |
|---|---|---|---|---|
| 6,011,613 | A | 1/2000 | Ohtomo et al. | |
| 6,137,567 | A | 10/2000 | Ohoka et al. | |
| 6,248,989 | B1 | 6/2001 | Ohishi | |
| 6,931,739 | B2 * | 8/2005 | Chang et al. | 33/286 |
| 2005/0005462 | A1 * | 1/2005 | Heger et al. | 33/286 |

OTHER PUBLICATIONS

Laserlevels.net RL-VH3 Series "Smart" Interior Lasers, pp. 1-4, Jan. 28, 2003.

Topcon RL-S1A/S1B, pp. 1-4, Sep. 1996.

* cited by examiner

SELF-ALIGNING, SELF PLUMBING BASELINE INSTRUMENT

BACKGROUND OF THE INVENTION

This invention is related to laser alignment instruments, and in particular to laser alignment instruments that are typically used in the construction of buildings.

FIELD OF THE INVENTION

The construction of buildings of all types requires a method of ensuring that the floors, walls and ceilings of the building are laid out and constructed in precisely the right orientation to the building site and to each other, i.e. level, vertical, and square. In recent years the layout of buildings has been facilitated by the use of laser alignment instruments that use a rotating laser beam to generate a precisely positioned and oriented plane of light that provides a reference point and line for both layout and installation of walls, floors and ceilings. Laser alignment instruments in general are well-known, and are exemplified by those disclosed in U.S. Pat. No. 5,946,087 to Kasori et al., U.S. Pat. No. 5,764,349 to Vanneman (applicant herein), and U.S. Pat. No. 5,108,177 to Middleton.

In most laser alignment instruments in use today, a plane of light is generated by generating a laser beam and converting the laser beam into a plane or partial plane of laser light by directing the laser beam onto a rotating prism (referred to as a penta prism) or mirror (referred to as a penta mirror). The details of construction of a penta prism are disclosed in U.S. Pat. No. 4,062,634, which is hereby incorporated herein by reference.

Most laser alignment instruments produce a single horizontal light plane for controlling elevation on job sites. More recent instruments can generate a vertical plane or two vertical planes at a prescribed angle to assist in vertical control and layout. None of the existing layout tools are capable however of simultaneously generating three perpendicular planes, all of which are coincident with a plumb beam that can be positioned on a reference point relative to the building.

DETAILED DESCRIPTION OF PREFERRED EMBODIMENTS

Figure 1A:
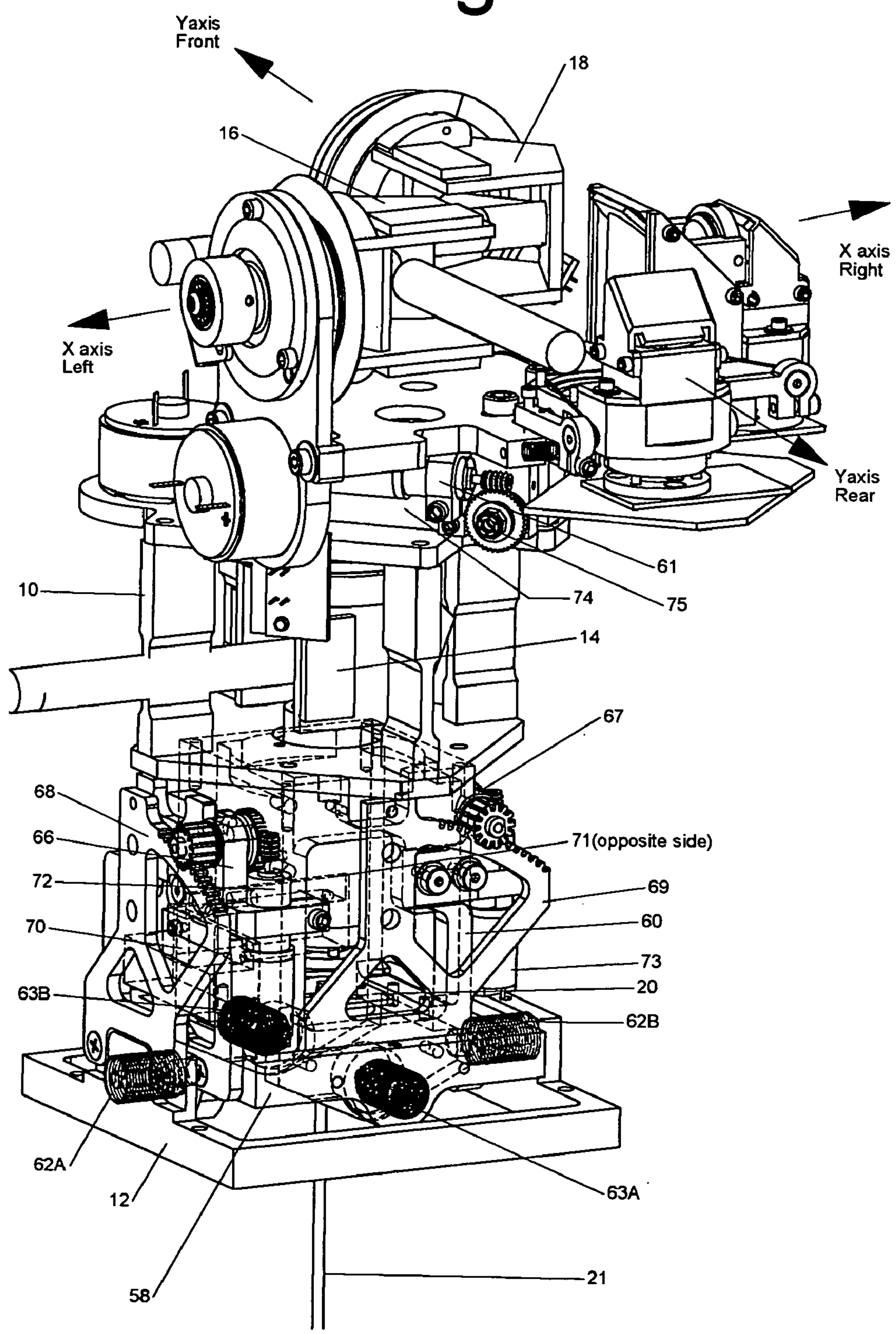
FIG. 1A is a rear isometric view of a preferred embodiment of the invention.

Referring now to FIGS. 1-4, a preferred embodiment of the invention is shown generally at 10, and includes base 12, a two axis (X&Y) leveling mechanism suspended in base 12, horizontal light plane assembly 14, vertical plane adjustment mechanism 74, a first vertical light plane assembly 16, a second vertical light plane assembly 18, and a plumb beam generator 20. Frame assembly 10 is mounted to gimbal mechanism and supports the light plane assemblies and plumb beam generator 14, 16, 18, and 20. Vertical light plane assemblies 16 and 18 are assembled together and adjusted to produce a fixed 90 degree relationship between planes 17 and 19. They are mounted to the vertical plane adjustment mechanism 74 above horizontal light plane assembly 14. The vertical plane adjustment mechanism 74 automatically rotates position of the 90 degree vertical planes independent of frame 10 and coaxially so that the vertical light planes 17 and 19 (FIG. 4) that are generated by vertical light plane assemblies 16 and 18 intersect in a line that is coincident with the plumb beam 21 (FIGS. 5 and 4) generated by plumb beam generator 20 with the plumb beam 21 precisely positioned on to a reference point 23 on the jobsite subsequently the vertical light planes are also precisely positioned to the same reference point.

The light plane assemblies are mounted on a self-leveling apparatus consisting of an inner and outer gimbal 58 (Y axis) and 60 (X axis) oriented perpendicularly to each other to create two separate axis of leveling (X and Y axis).

Referring to FIG. 1, each gimbal assembly includes two shafts 62(AB) and 63(AB) mounted to base 12 and outer gimbal 58, respectively. Level detectors 70 (Y axis) and 71 (X axis), two leveling drives 66 and 67 each engaged by pinion gears to curved gear sectors 68 and 69, respectively.

Each gimbal assembly maintains the light plane assemblies level in its respective axis by controlling the servo motor and gear assembly 72 and 73 to level the gimbal frames 58 and 60 responsive to a signal from level detector 70 and 71. Level detector is an electrolytic tilt sensor such as those manufactured by Fredericks Company, in which an electrically conductive liquid connects a series of electrodes. The resistance of the tilt sensor varies with the position of the level detectors. The variation in resistance generates a corrective signal that is transmitted to the servo assembly which operates to adjust the position of the gimbal frames 58 and 60 until level detector 70 and 71 senses a level orientation.

Both perpendicular leveling assemblies operate simultaneously to accurately and precisely level the frame assembly 10 in two perpendicular planes. With the frame assembly maintained in a level orientation, the vertical and horizontal light plane assemblies are continuously and precisely maintained in their respective vertical and horizontal orientations.

Figure 3:
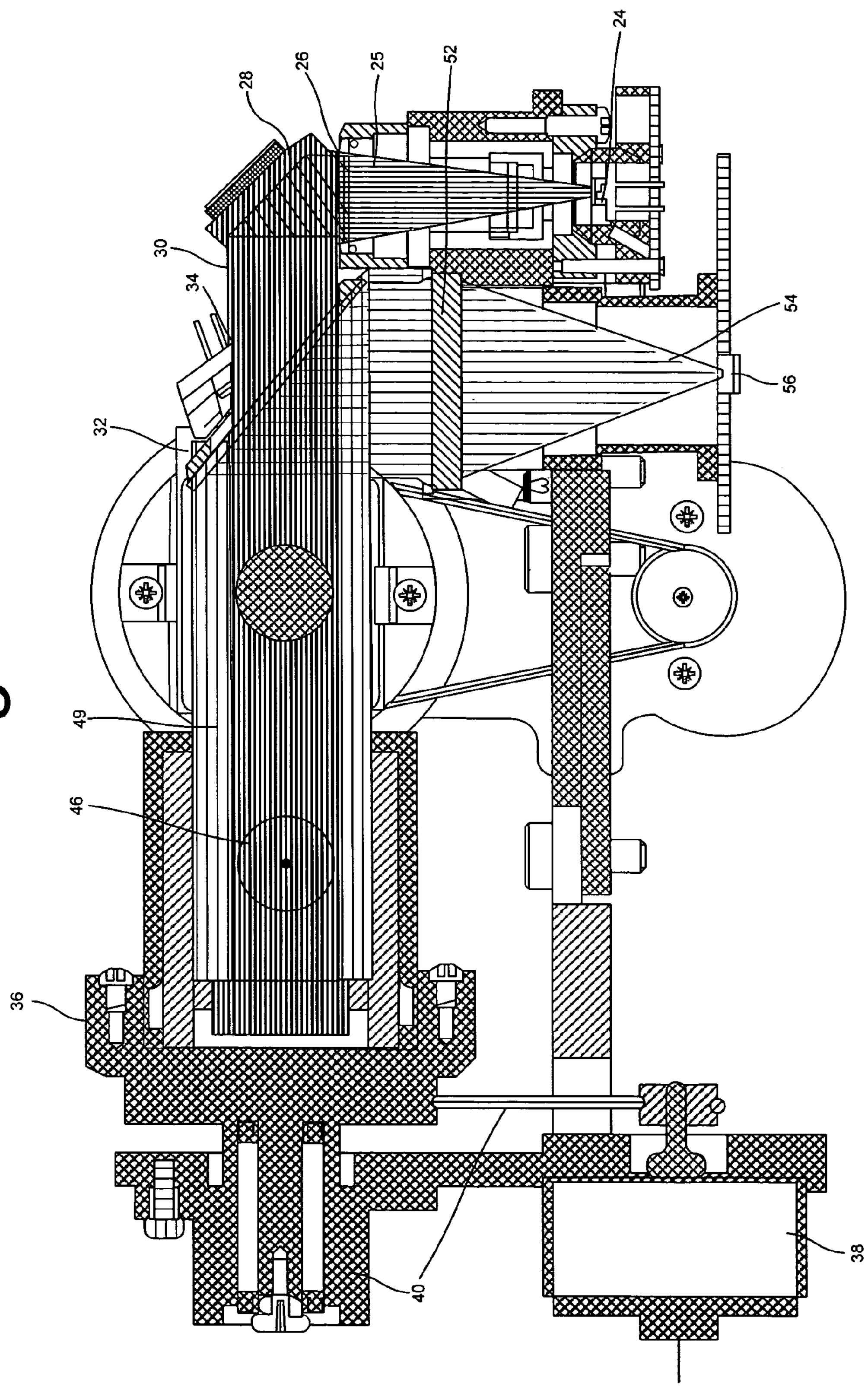
FIG. 3 is a cross sectional view of the vertical light plane assembly according to the preferred embodiment of the invention.

Referring to FIG. 3, vertical light plane assembly 16 will be described in detail. Laser diode 24 emits a laser beam that is collimated as it passes through collimating lens 26. Mirror 28 redirects the collimated beam 30 toward return mirror 32, which includes a central aperture 34 through which collimated beam 30 passes. Collimated beam 30 enters penta mirror assembly 36. Penta mirror assembly 36 includes a motor 38 and drive assembly 40 that rotate penta mirror 36. Penta mirror 36 includes an aperture 46 that is oriented perpendicularly to the incoming collimated beam 30, and through which collimated beam 30 exits penta mirror 46 toward a remote target. The rapid rotation of penta mirror 36 generates a plane of light as depicted in FIG. 3. Vertical light plane assembly 18 is similar to assembly 16 as just described, and operates in a similar manner to generate the second vertical light plane that is perpendicular to the first vertical light plane.

Figure 4:
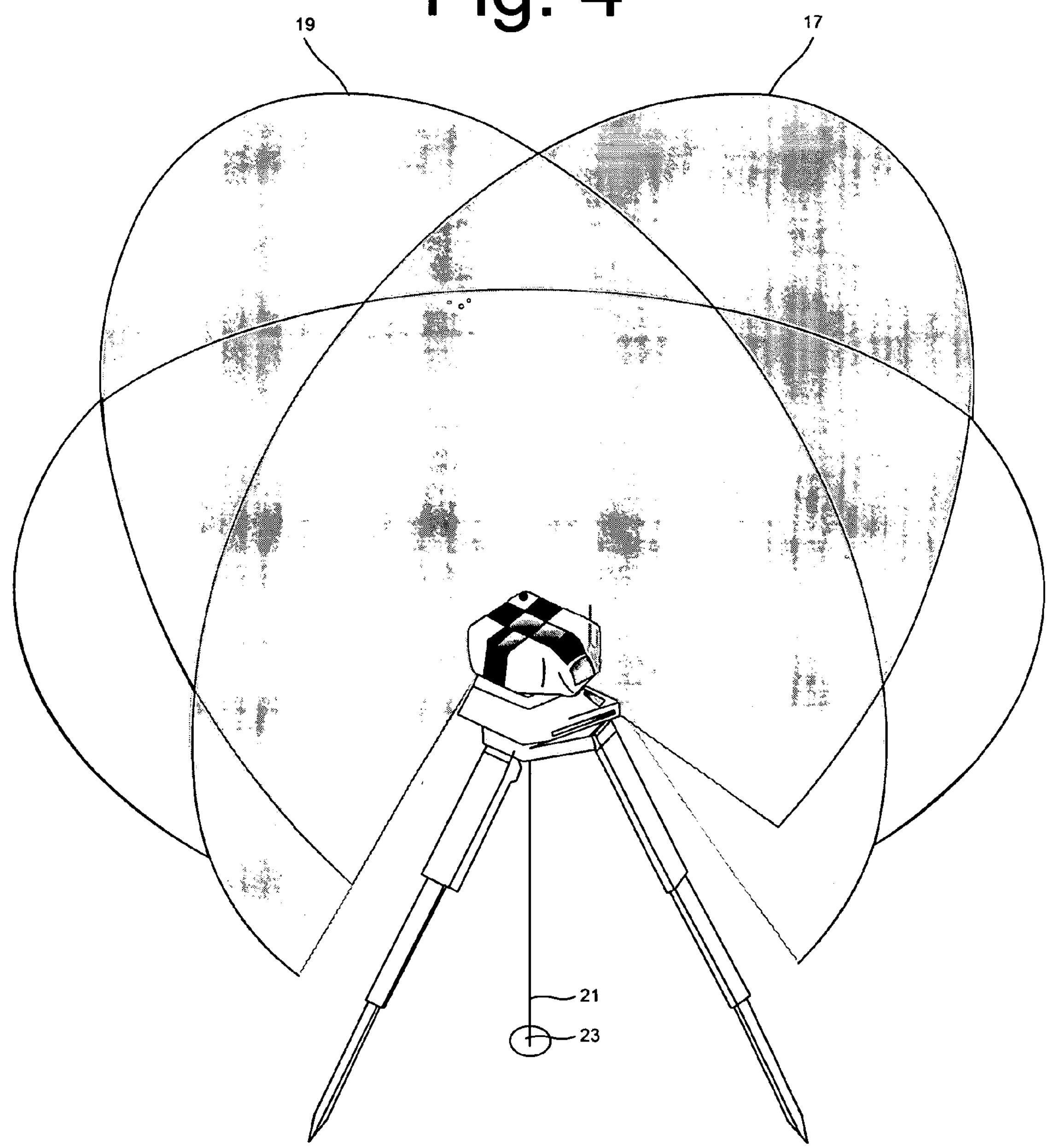
FIG. 4 is a front/left perspective view of the embodiment shown in FIG. 1 mounted on a tripod 1—and generating two perpendicular vertical light planes, a horizontal light plane, and a vertical plumb beam.
Figure 5:
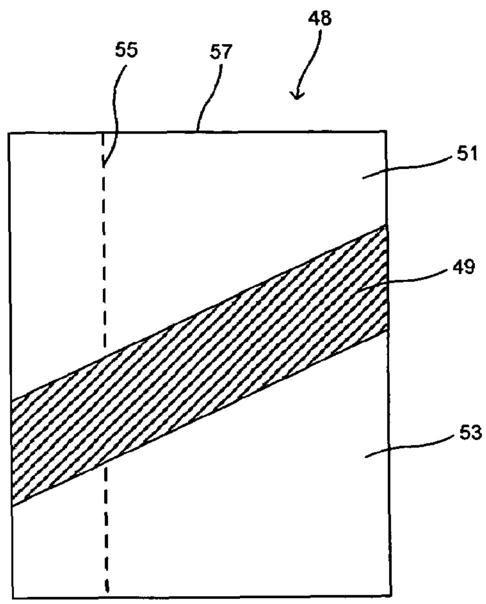
FIGS. 5-11 are front elevational views of preferred embodiments of targets for use in positioning the light planes generated by the preferred embodiments of the invention.
Figure 6:
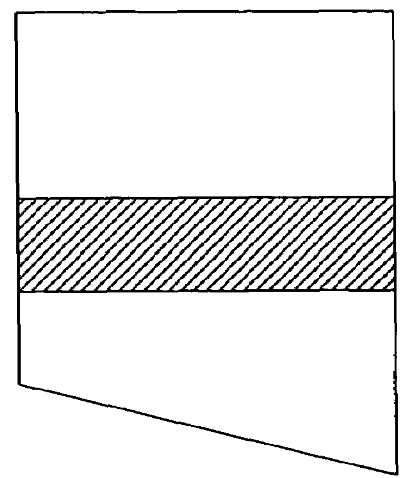
Figure 7:
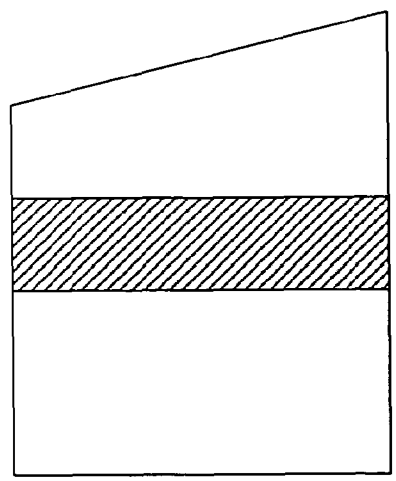
Figure 8:
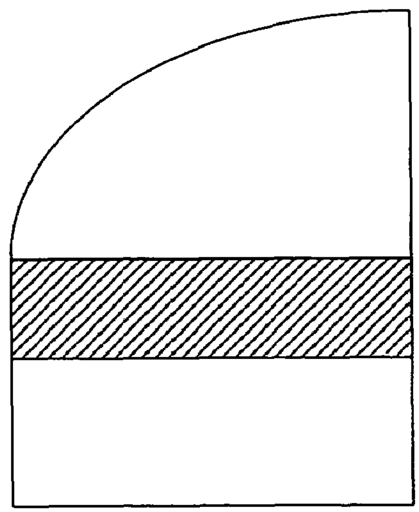
Figure 9:
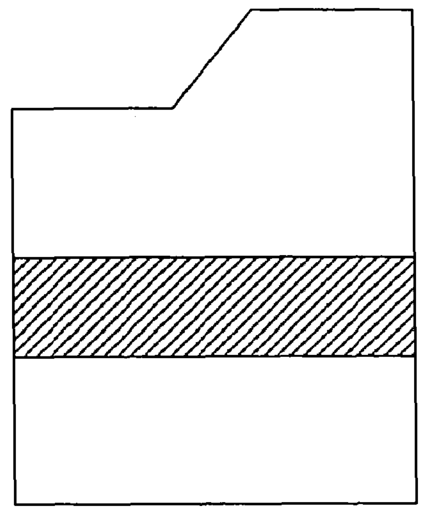
Figure 10:
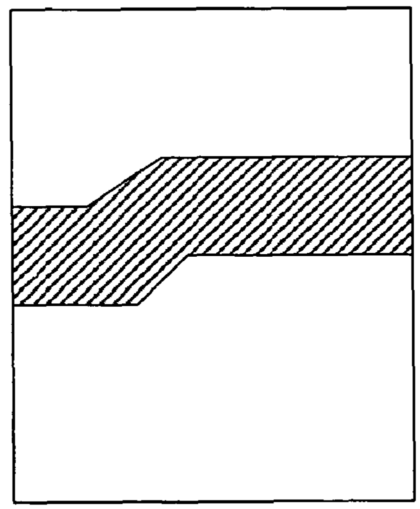
Figure 11:
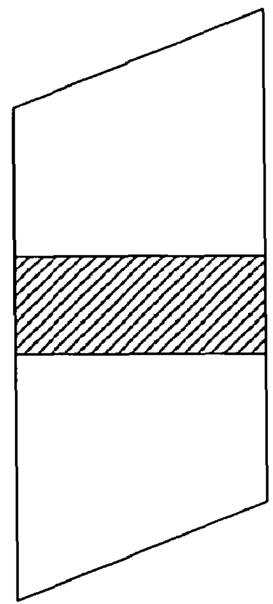

A remote target is positioned at a predetermined location selected to define the lateral location of a wall. As the light plane impinges on the target, the beam is reflected back toward penta mirror aperture 46. The penta mirror redirects the reflected beam 49 to return mirror 32, which turns the beam 90 degrees onto condensing lens 52. Condensing lens 52 focuses a converged beam 54 onto a photodetector 56 which determines the position of the beam relative to the target 48 (FIG. 4).

Figure 1B:
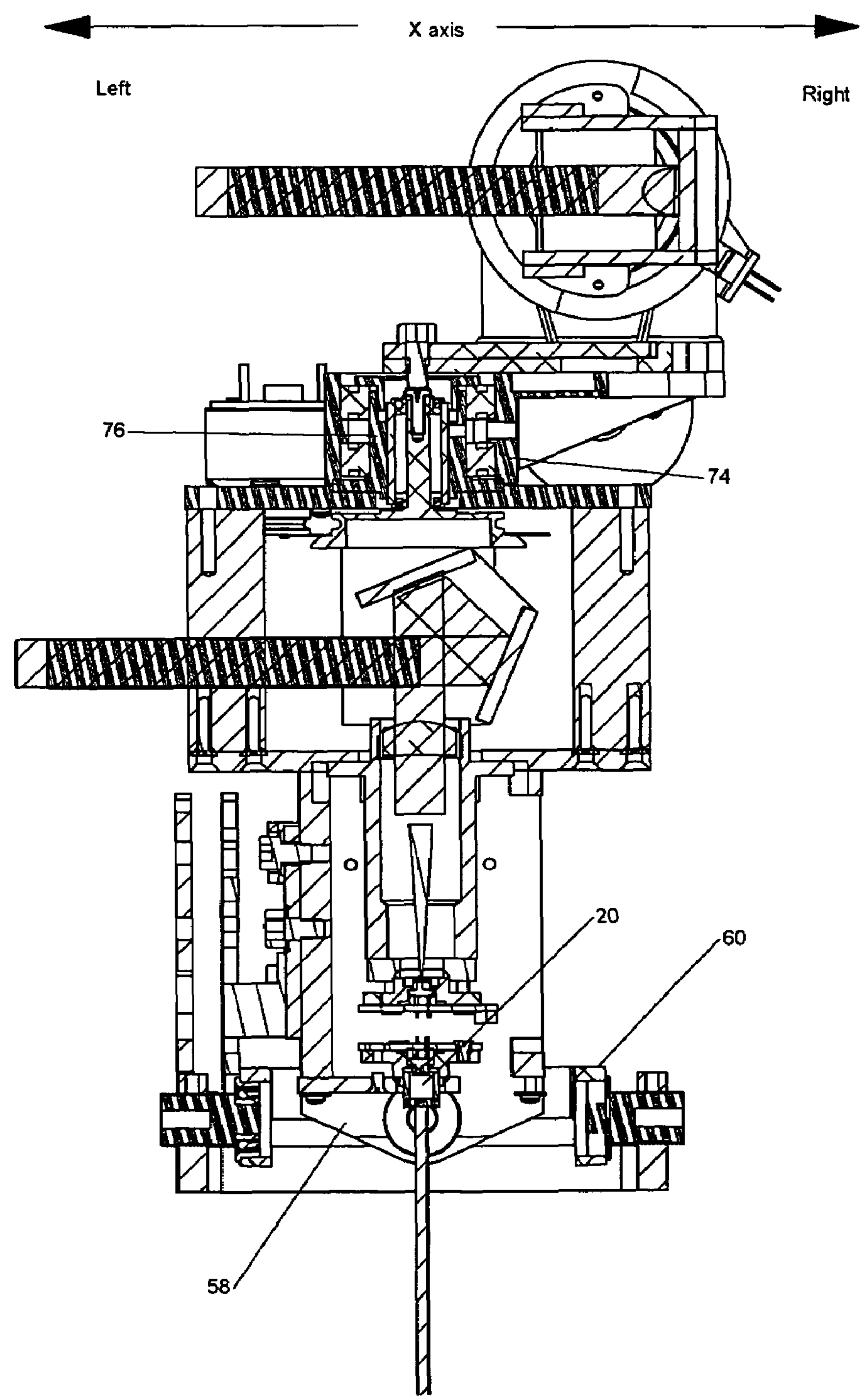
FIG. 1B is a rear cross sectional view of the embodiment shown in FIG. 1A.
Figure 2:
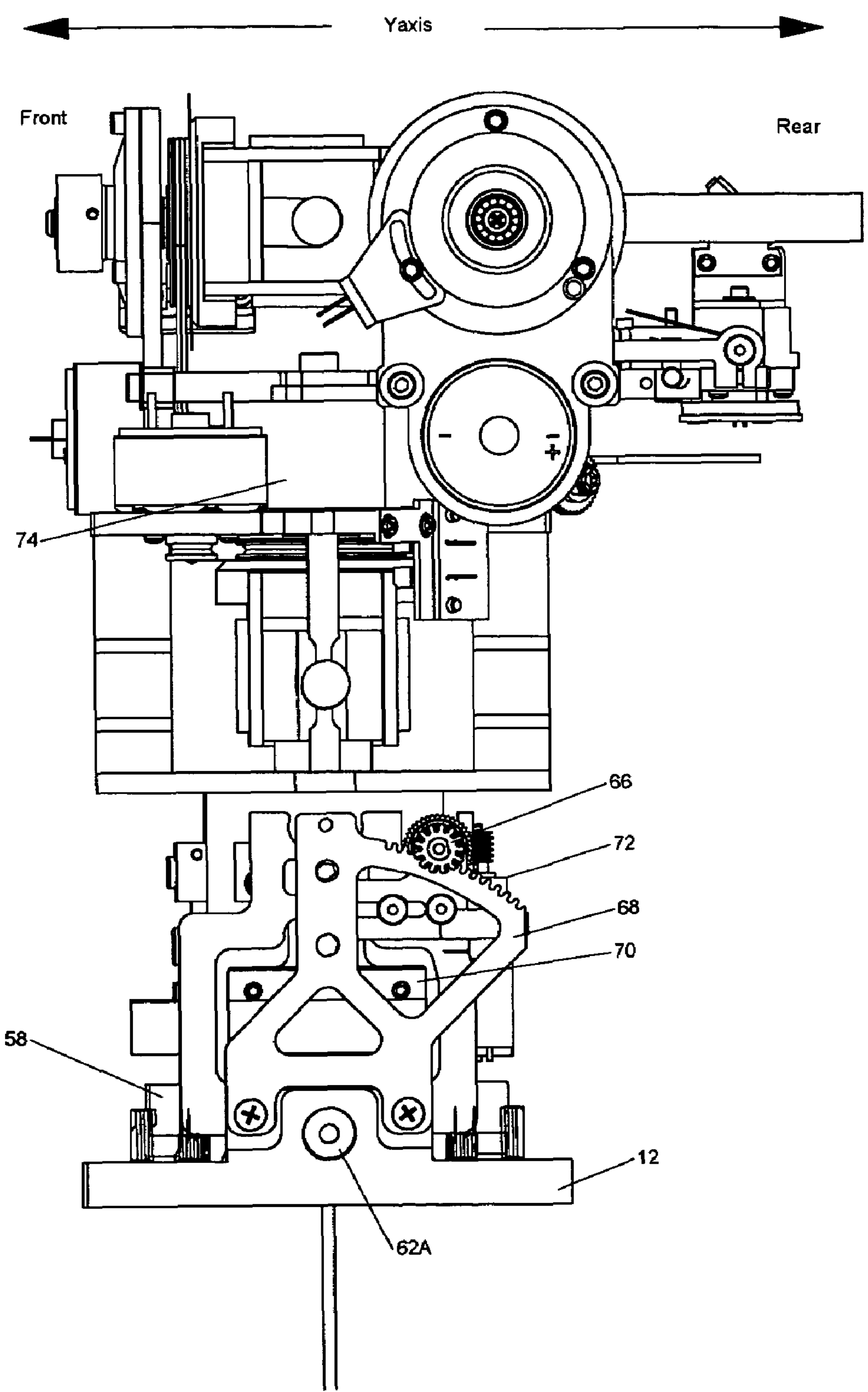
FIG. 2 is a left elevational view of the embodiment shown in FIG. 1A.

Referring to FIGS. 1A and 1B, in one preferred embodiment of the invention each vertical light plane assembly also are mounted to common frame 74 which includes a motor 61 coupled to drive screw 75 which adjust both vertical planes rotating about the center axis of the plumb beam 21. The motor is operable responsive to a signal from the photodetector 56 to adjust the position of the light plane to maintain the light plane at a predetermined position on a target 48.

Referring to FIGS. 5-11, the position of the lateral light plane relative to the center of the target is determined in the following way. Target 48 includes a pair of reflective portions 53 and 51 that are separated by a non-reflective portion 49 that bisects the pair of reflective portions. Examples of target 48 are shown in FIGS. 5-11. The laser beam generated by the light plane assembly is pulsed at a predetermined frequency. When the beam passes over the first reflective portion 51, it is reflected back to the light plane assembly as described above and onto the photodetector 56. The beam then passes over the non-reflective portion 49 and then over the second reflective portion 53 where the beam is again reflected back onto the photodetector 56. At any lateral location on the target the non-reflective portion that bisects the first and second reflective portions defines first and second reflective segments having respective widths that differ by a predetermined amount. The photodetector 56 determines the lateral location of the light plane on the target by counting the number of pulses in the beam reflected from each reflective portion of the target as the beam is swept across the target. The ratio of pulses from the first and second reflected beams corresponds to a specific location on target 48, informing the photodetector 56 whether and in which direction to operate motor 61 to reposition the laser. For example, referring to FIG. 5, if the light plane strikes target 48 at location 55, the ratio of pulses reflected from portions 51 and 53 of target 48 will be greater than one. Upon receiving and counting the pulses from each portion, the photodetector 56 generates a control signal that causes motor 61 to move the position of the vertical light plane to the right towards the center 57. When the ratio of pulses from the two target portions is equal to one (within programmed tolerances), the vertical light plane is properly positioned relative to the target and there is no signal from photodetector 56 to operate motor 61. FIGS. 6-11 illustrate other embodiments of target 48. In each instance the ratio of the length of portions 51 and 53 at the center of the target is referenced as the target point toward which the light plane is moved and maintained.

While the invention has been described by reference to preferred embodiments, the described embodiments are intended to illustrate the invention rather than limit the scope of the invention. Those of skill in the art will recognize that numerous changes can be made to the preferred embodiments without departing from the scope of the invention.

What is claimed is:

1. A baseline instrument comprising:
  - a first light assembly including a single laser operable to generate a first vertical light plane extending over a radial area greater than about 180 degrees;
  - a second light assembly including a single laser operable to generate a second vertical light plane at an angle to the first vertical light plane and extending over a radial area greater than about 180 degrees; and
  - a third light assembly operable to generate a horizontal light plane that is perpendicular to the first and second vertical light planes.

2. The baseline instrument according to claim 1, wherein the third light assembly is self leveling.

3. The baseline instrument according to claim 1, wherein the first and second light assemblies are self aligning.

4. The baseline instrument according to claim 1, wherein the third light assembly is operable to generate the horizontal light plane such that the horizontal light plane extends over a radial area greater than about 180 degrees.

5. The baseline instrument according to claim 1, wherein the second light assembly is operable to generate the second vertical light plane at a predetermined angle to the first vertical light plane.

6. The baseline instrument according to claim 5, wherein the predetermined angle is 90 degrees.

7. The baseline instrument according to claim 1, further comprising a fourth light assembly operable to generate a vertical light beam that defines a reference point on an underlying surface, the vertical light beam being parallel to the first and second vertical light planes and perpendicular to the horizontal light plane.

8. The baseline instrument according to claim 7, wherein the first and second vertical light planes intersect at a line parallel to and directly above the vertical light beam.

9. The baseline instrument according to claim 7, wherein the vertical light beam is coaxial with a rotational axis of the first and second light assemblies.

10. The baseline instrument according to claim 7, wherein the first, second, and fourth light assemblies are self plumbing.

11. The baseline instrument according to claim 7, wherein the first, second, third, and fourth light assemblies are mounted on a gimbal mechanism.

12. A baseline instrument comprising:
  - a first light assembly including a rotating penta mirror having a first portion oriented to receive a collimated beam and a second portion oriented to receive a reflected beam and to direct the reflected beam to a mirror oriented to redirect the reflected beam from the rotating penta mirror to a photo cell assembly, wherein the first light assembly is operable to generate a first vertical light plane extending over a radial area greater than about 180 degrees; and
  - a second light assembly operable to generate a second vertical light plane at an angle to the first vertical light plane and extending over a radial area greater than about 180 degrees.

13. The baseline instrument according to claim 12, wherein the first light assembly generates a pulsed laser beam.

14. The baseline instrument according to claim 12, wherein the mirror is a first mirror, the first light assembly further includes a light source, a collimating lens in communication with the light source, and a second mirror, and the second mirror is oriented to redirect the collimated beam from the collimating lens to the rotating penta mirror.

15. The baseline instrument according to claim 12, wherein the first light assembly includes a single laser.

16. The baseline instrument according to claim 12, further comprising a third light assembly operable to generate a horizontal light plane that is perpendicular to the first and second vertical light planes.

17. The baseline instrument according to claim 16, wherein the third light assembly is operable to generate the horizontal light plane such that the horizontal light plane extends over a radial area greater than about 180 degrees.

18. The baseline instrument according to claim 12, further comprising a fourth light assembly operable to generate a vertical light beam that defines a reference point on an underlying surface, the vertical light beam being parallel to the first and second vertical light planes.

19. The baseline instrument according to claim 18, wherein the first and second vertical light planes intersect at a line parallel to and directly above the vertical light beam.

20. The baseline instrument according to claim 12, wherein the second light assembly is operable to generate the second vertical light plane at a predetermined angle to the first vertical light plane.

21. The baseline instrument according to claim 20, wherein the predetermined angle is 90 degrees.

22. The baseline instrument according to claim 12, further comprising an adjuster assembly in communication with the first light assembly and operable to adjust the position of the first and second vertical light planes.

23. The baseline instrument according to claim 22, wherein the adjuster assembly is operable to adjust the position of the first and second vertical light planes in response to a signal from the photo cell assembly.

* * * * *